US005218946A

United States Patent [19]

Wild et al.

[11] Patent Number: 5,218,946

[45] Date of Patent: Jun. 15, 1993

[54] METHOD AND ARRANGEMENT FOR CHECKING THE OPERABILITY OF AN ELECTRIC HEATER IN A MOTOR VEHICLE

[75] Inventors: Ernst Wild, Oberriexingen; Manfred Mezger, Tamm; Klaus Ries-Müller, Bad Rappenau, all of Fed. Rep. of Germany

[73] Assignee: Robert Bosch GmbH, Stuttgart, Fed. Rep. of Germany

[21] Appl. No.: 951,856

[22] Filed: Sep. 28, 1992

[30] Foreign Application Priority Data

Sep. 26, 1991 [DE] Fed. Rep. of Germany ....... 4132008

[51] Int. Cl.[5] ....................... F02D 41/14; B60R 16/02; G01N 27/416

[52] U.S. Cl. .................................... 123/690; 123/697

[58] Field of Search ........................ 123/479, 690, 697

[56] References Cited

U.S. PATENT DOCUMENTS

| | | | |
|---|---|---|---|
| 3,915,828 | 10/1975 | Cleary et al. | 204/424 |
| 4,170,967 | 10/1979 | Wessel et al. | 123/697 |
| 4,419,190 | 12/1983 | Dietz et al. | 204/408 |
| 4,724,815 | 2/1988 | Mieno et al. | 123/690 |
| 4,958,611 | 9/1990 | Uchinami et al. | 123/690 |
| 5,054,452 | 10/1991 | Denz | 123/479 |
| 5,090,387 | 2/1992 | Mayer et al. | 123/479 |
| 5,111,792 | 5/1992 | Nagai et al. | 123/697 X |
| 5,148,795 | 9/1992 | Nagai et al. | 123/697 |

*Primary Examiner*—Willis R. Wolfe
*Attorney, Agent, or Firm*—Walter Ottesen

[57] ABSTRACT

The invention relates to a method and an arrangement for checking the operability of an electric heater in motor vehicles and especially the heater of an oxygen probe which is mounted in the exhaust gas channel of an internal combustion engine. It is necessary to determine the temperature-dependent electrical resistance and the temperature of the oxygen probe heater for a precise evaluation of the operational state of the oxygen probe heater. The basic principle of the invention is based upon the consideration that the measurement of the electrical resistance of the oxygen probe heater is then carried out when the oxygen probe heater has cooled down to the ambient temperature. Whether this cool down has taken place can be determined in various ways in accordance with the invention, for example, from the cool down of the engine block or by a comparison of the engine block temperature to the intake-air temperature. The operating state of the oxygen probe heater so determined is displayed to the driver by the activation of a corresponding control device and/or, if required, read into a fault memory.

9 Claims, 4 Drawing Sheets

METHOD AND ARRANGEMENT FOR CHECKING THE OPERABILITY OF AN ELECTRIC HEATER IN A MOTOR VEHICLE

FIELD OF THE INVENTION

The method of the invention and the arrangement for carrying out the method relate to the checking of the operability of a heater in a motor vehicle and especially the heater of an oxygen probe which is mounted in the exhaust gas channel of an internal combustion engine. The method and arrangement of the invention also relate to checking the supply lines of the heater.

BACKGROUND OF THE INVENTION

The operating principle of the invention is explained with respect to the heater of an oxygen probe. The application of the invention is however not limited to the application in connection with the oxygen probe but is always then applicable when heaters having a temperature-dependent resistance are to be checked with the aid of a temperature sensor mounted at a remote location.

The oxygen content of the exhaust gas is determined with the oxygen probe and the value determined in this manner is supplied to a control arrangement which operates to adjust a pregiven air/fuel ratio. The oxygen probe is only operationally ready above a minimum operating temperature. In this way, the control of the air/fuel mixture by means of the oxygen probe is only then possible when the oxygen probe has reached its operating temperature. Only then can a control to an optimal air/fuel mixture take place, for example, with respect to a low emission of toxic material. The operating temperature of the oxygen probe should be reached as rapidly as possible after the internal combustion engine is started in order to hold the emission values low. The heat-up of the oxygen probe takes place by means of the exhaust gases of the engine and is accelerated by the electric oxygen probe heater for the reasons delineated above. The electric oxygen probe heater is also then necessary when, for example, the heating capacity of the exhaust gas is inadequate such as during idle in order to maintain the oxygen probe at the operating temperature or for overrun operation which takes a longer time.

It is necessary to check the operability of the oxygen probe heater in the context of providing a low emission of toxic materials. Many methods are known in order to recognize one or several fault conditions such as interruptions, short circuits and shunts. The test of the operability of the oxygen probe heater takes place in a number of ways, for example: via the current flow through the oxygen probe heater detected by means of the measuring resistance as disclosed in United States patent application Ser. No. 07/862,567, filed Jun. 22, 1992, still pending; via the output signals of the oxygen probe as disclosed in U.S. Pat. Nos. 4,170,967 and 5,054,452; via the heat-up performance of the oxygen probe as disclosed in U.S. Pat. No. 5,090,387; or, via the oxygen probe temperature which can be determined in various ways such as from the internal resistance of the oxygen probe as disclosed in U.S. Pat. No. 4,419,190 or with a temperature sensor as disclosed in U.S. Pat. No. 3,915,828.

The methods recited above have the disadvantage that only a severe malfunction of the oxygen probe heater can be detected. The precise value of the electrical resistance of the oxygen probe heater is usually not included in the check of operability since the electrical resistance varies considerably in dependence upon temperature even for an oxygen probe heater which is fully operational and, for this reason, a relatively large desired value interval must be pregiven. In this way, only such deviations of the resistance from the desired value can be reliably detected which are greater than the resistance changes caused by temperature fluctuations and occurring during normal operation. A changed resistance can however lead to a lower heating capacity of the oxygen probe heater and therefore lead to a longer heat-up time of the oxygen probe. In this way, the toxic material emission of the engine increases since the time duration becomes longer until the oxygen probe can take over the control function for which it is provided. The reverse case, namely an increased heating capacity, can lead to damage of the oxygen probe and/or of the oxygen probe heater by exceeding the maximum permissible operating temperature.

SUMMARY OF THE INVENTION

It is an object of the invention to provide a method of checking as to whether the oxygen probe heater is in a trouble-free condition. It is another object of the invention to carry out this check with components and means which are already in place and available.

The method of the invention affords the advantage that the actual value of the electric resistance of the oxygen probe heater determined according to the method can be compared to desired values pregiven in a narrow tolerance range since the influence of the temperature on the electrical resistance is considered for the determination of the actual value as well when making the comparison with the desired value interval. In this way, already a slight deviation of the electric resistance from the desired value is detected and suitable measures can be taken such as warning the driver and/or adapting the supply voltage to the changed resistance value. A further advantage is that this improvement can be realized with respect to known monitoring arrangements without too much difficulty. The determination of the temperature of the oxygen probe heater is carried out with the temperature sensors already available. Only very modest additional circuitry is required for use in combination with a central control apparatus. If the control takes place via a computer then the program must only the changed and a few additional program parts installed.

The use of the monitoring operation provided by the invention is especially necessary because a change of the electric resistance of the oxygen probe heater is not an exception; rather, it is the rule because of the effects of aging. It is necessary to ensure that an optimal control of the air/fuel ratio can be provided under as many operating conditions as possible because of a planned reduction in the statutory limit values for the emission of toxic materials from internal combustion engines.

BRIEF DESCRIPTION OF THE DRAWINGS

The invention will now be described with reference to the drawings wherein.

DESCRIPTION OF THE PREFERRED EMBODIMENTS OF THE INVENTION

The invention relates to a method and an arrangement for checking the operability of a heater in motor vehicles and especially the heater of an oxygen probe. The operability is then ensured when the electric resistance of the oxygen probe heater lies at a pregiven temperature within a pregiven interval. In this case, it is noted that the electric resistance of the oxygen probe heater is dependent upon temperature. For this reason, it is necessary that the temperature of the oxygen probe heater be detected in addition to the electric resistance of the heater. The desired value interval to which the measured resistance of the oxygen probe heater is compared is likewise dependent upon temperature. For this comparison, resistance values are applied which have been determined for the same temperature.

The resistance measurement is then carried out when the temperature of the oxygen probe heater is approximately equal to the engine temperature. The engine temperature is determined with a sensor for cooling water temperature or a sensor for oil temperature which is already in place.

Figure 1:
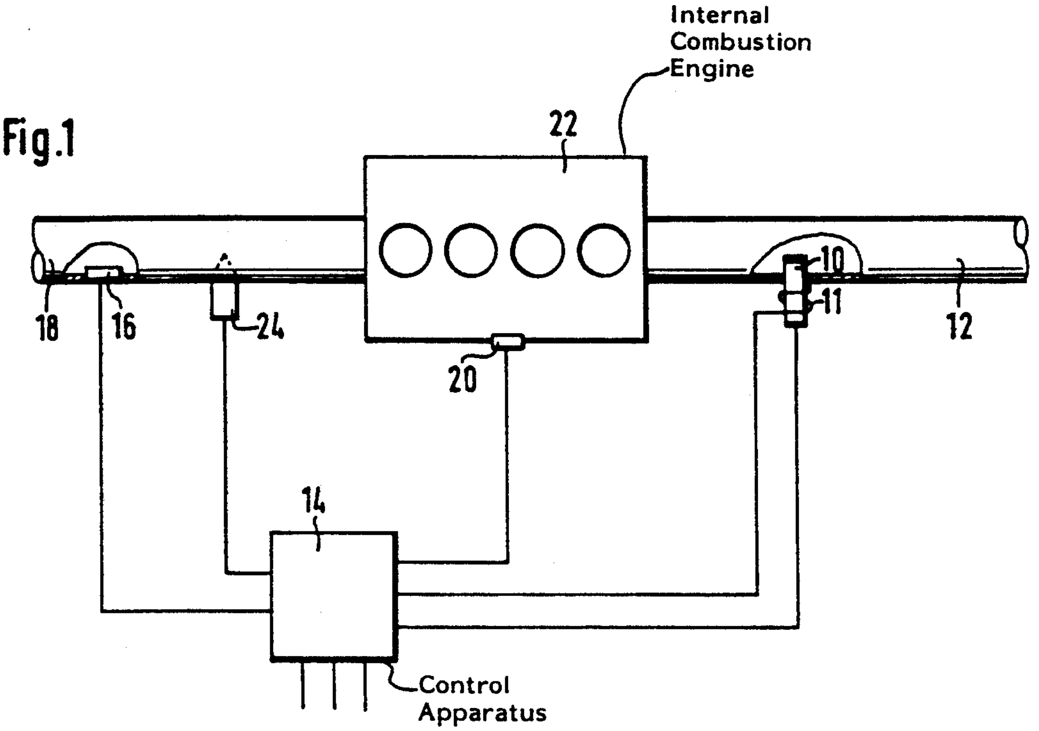
FIG. 1 is a schematic representation of an internal combustion engine shown with the components essential in the context of the method and arrangement of the invention.

FIG. 1 shows a schematic representation of an internal combustion engine together with components essential for the invention. An oxygen probe 10 and its heater 11 are mounted in the exhaust gas channel 12 of the engine and are connected to a central control apparatus 14. The central control apparatus 14 receives data from additional sensors such as a temperature sensor 16 in the intake pipe 18 or a sensor 20 for the temperature of the engine block 22 and controls a device 24 for metering fuel.

Figure 2:
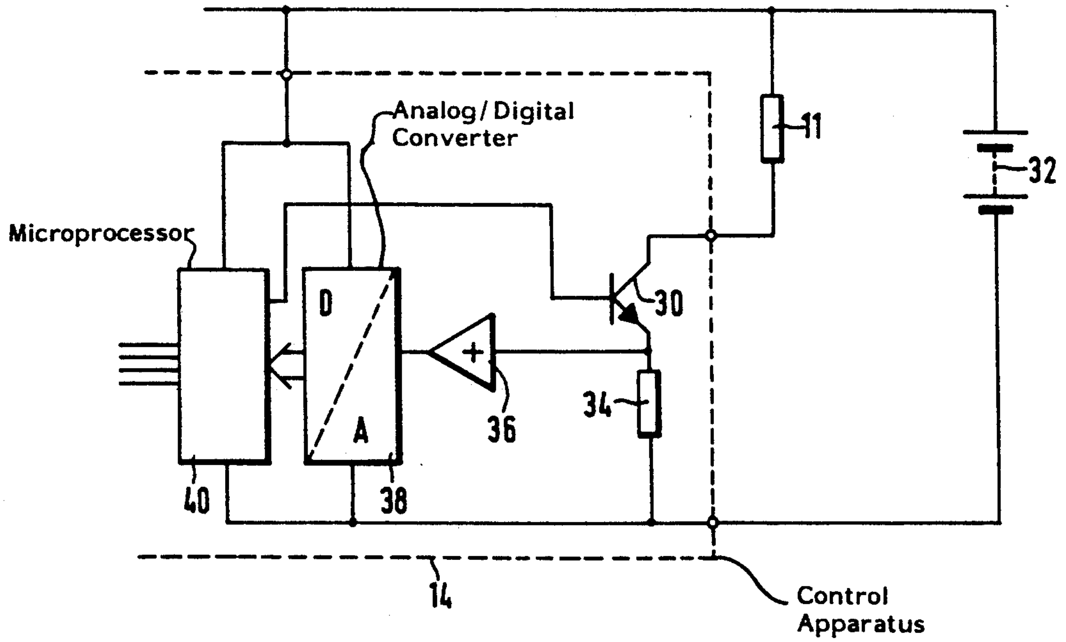
FIG. 2 is a schematic of an embodiment of the arrangement of the invention.

FIG. 2 shows a schematic of an embodiment of the arrangement according to the invention. The oxygen probe heater 11 is connected between the collector of a transistor 30 and the plus pole of a battery 32. The emitter of the transistor is connected via a measuring resistor 34 to the minus pole of the battery. Furthermore, a connection is provided between the emitter of the transistor and a non-inverting input of an operational amplifier 36. An analog/digital converter 38 is connected to the output of the operational amplifier. The converter 38 conducts the digitalized signal to a microprocessor 40. A control output of the microprocessor 40 is connected to the base of the transistor 30. Further connecting lines to the microprocessor 40 are provided for transmitting the detected fault conditions to a display device (not shown) and for the data exchange with other electronic devices. The microprocessor 40 and the analog/digital converter 38 receive their supply voltage from the battery 32. The components identified by reference numerals 30, 34, 36, 38 and 40 are components of the control apparatus 14.

Figure 3:
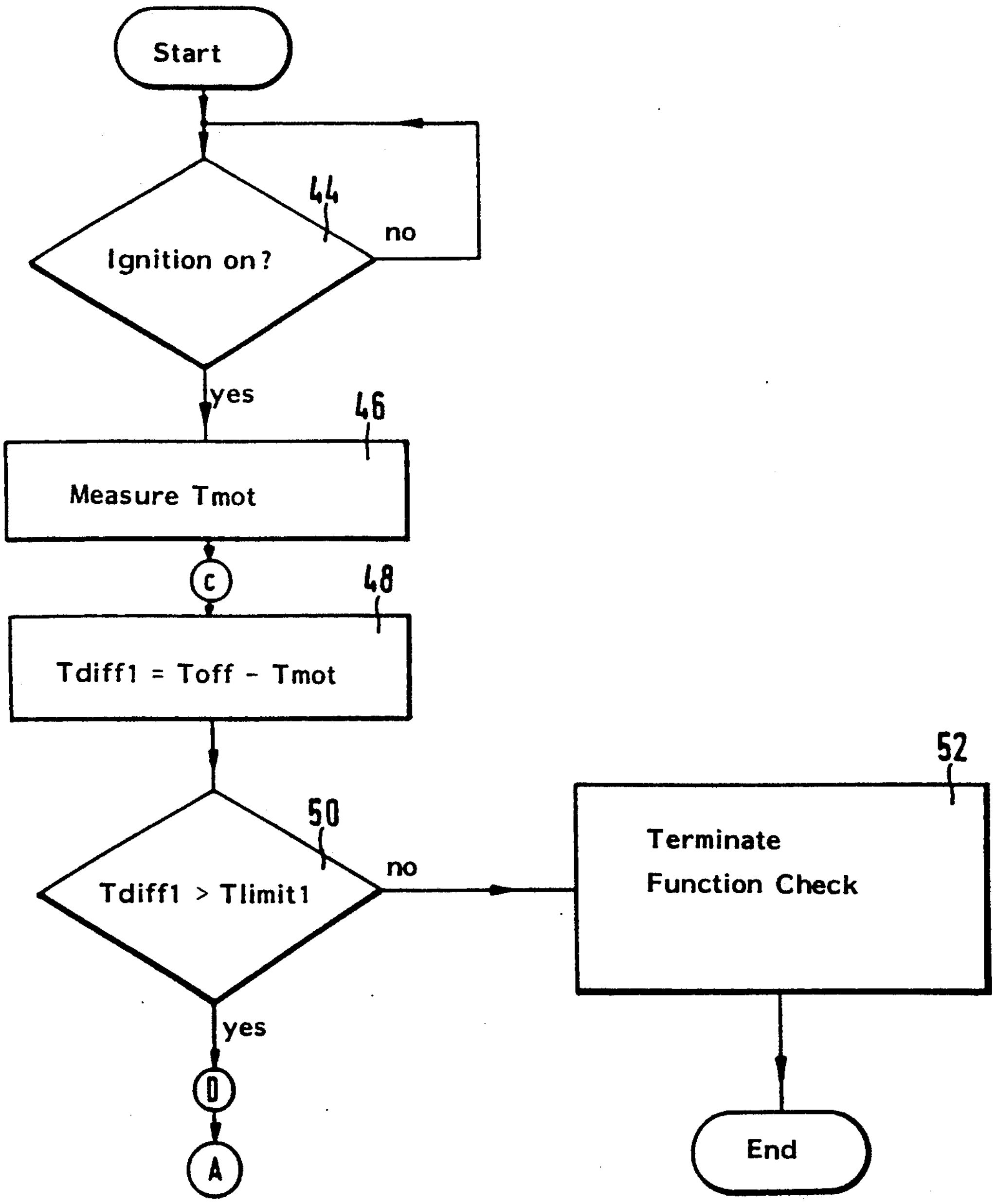
FIG. 3 is a flowchart of an embodiment of the method of the invention with which a determination can be made as to whether the engine block and the oxygen probe heater are at approximately the same temperature.

A flowchart of an embodiment of the method is shown in FIG. 3. With this embodiment, a determination is made as to whether the engine block and the oxygen probe heater are at approximately the same temperature.

In a first step 44, the inquiry is made as to whether the ignition is switched on. If the ignition is switched on, the temperature Tmot of the engine block is measured in the next step 46; otherwise, the inquiry 44 is repeated.

Steps 48 to 52 follow step 46 and can be replaced by the flowchart shown in FIG. 5 which is described further below. This alternate embodiment is represented by the reference letter C between the steps 46 and 48 and reference D at the yes-output of step 50.

After step 46, the method continues with step 48 wherein the difference Tdiff1 is formed from the engine block temperature Toff at the last switch-off of the engine and the actual engine block temperature Tmot. The determination of Toff is not shown and takes place in the following manner: the engine block temperature measured in step 46 is stored in a RAM-cell. The content of the RAM-cell is written into a second RAM-cell when the ignition is switched off and, with the next switch-on of the ignition, the value Toff is read out of this second RAM-cell. Suitable measures ensure that the memory content of the second RAM-cell is maintained even when the ignition is switched off.

Step 50 follows step 48 and the inquiry is made in step 50 as to whether Tdiff1 is greater than a pregiven value Tlimit1. If this is the case, then the assumption can be made that the engine block has cooled down to the ambient temperature. The oxygen probe including the heater has then also cooled down to the ambient temperature because of its low thermal mass so that the oxygen probe now is at the same temperature as the engine block.

Figure 4:
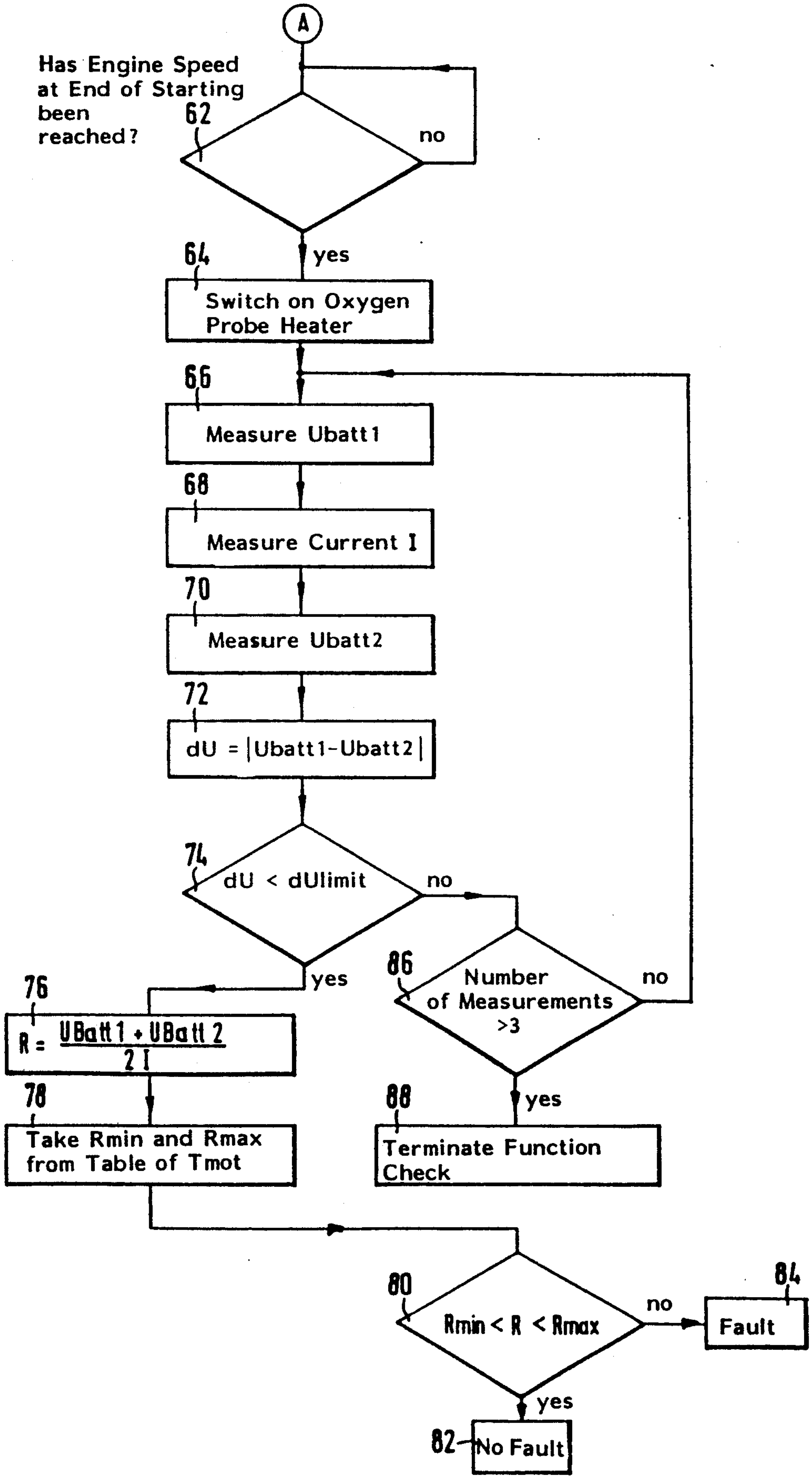
FIG. 4 is a flowchart of a method for checking the oxygen probe heater at a known temperature; and, FIG. 5 is a portion of a flowchart of an embodiment of the method as an alternative to the embodiment shown in FIG. 3.

In this way, the temperature of the oxygen probe heater is known and the operational check can be continued with the sequence shown in FIG. 4. The connecting location is identified by reference character A. If the condition in step 50 is not fulfilled, then a determination is made in step 52 that the function check of the oxygen probe heater cannot be continued since the temperature of the oxygen probe heater is not known.

In FIG. 4, a flowchart for checking the function of the oxygen probe heater at a known temperature is shown. The symbol A at the start of the flowchart indicates the connection to the flowchart of FIG. 3 which is identified in a like manner.

Step 62 follows the connecting point A and a check is made in this step as to whether the engine speed at the end of starting has been reached. Only when this is the case, can the method continue to the next step. In this next step 64, the oxygen probe heater is switched on. Thereafter, in step 66, the battery voltage Ubatt1 is measured. Thereafter, in step 68, the measurement of the current I which flows through the oxygen probe heater is measured and, thereafter, the battery voltage is measured again in step 70 and is stored as value Ubatt2. In the next step 72, the amount of the difference dU of the two measured battery voltages Ubatt1 and Ubatt2 is formed. In step 74, an inquiry is made as to whether dU is less than a pregiven value dUlimit. If this condition is fulfilled, then, in step 76, the resistance R of the series circuit of the oxygen probe heater 11, collector-emitter path of the transistor 30 and the measuring resistance 34 is determined in that the mean value of the voltage Ubatt1 and Ubatt2 is divided by the current I measured in step 68. The series circuit is shown in FIG. 3 and was explained further above.

Thereafter, in step 78, the desired value interval (Rmin, Rmax) of the resistance of the oxygen probe heater including the resistors connected in series therewith for the measured temperature Tmot is determined from a temperature-dependent characteristic field. In the next inquiry step 80, a check is made as to whether the actual value R determined in step 76 lies within the desired value interval (Rmin, Rmax). If this is the case, then, in the next step 82, a conclusion is drawn as to the operability of the oxygen probe heater.

If the condition 80 is not fulfilled, then in step 84, which follows the condition 80, a malfunction of the heater is determined. The reactions to the malfunction so detected are not shown in FIG. 4 and can, for example, be an entry into the fault memory and/or a warning to the driver. The entry in the fault memory can be evaluated during the next visit to the service center and the fault eliminated.

If the determination is made in step 74 that the fluctuation of the battery voltage dU does not lie within the pregiven range dUlimit, then the step 86 is carried out next wherein a check is made as to whether more than three measurements for determining R have been carried out since the engine has been started. If this is the case, then step 88 follows and the operational check is discontinued. Otherwise, the method proceeds with step 66.

In the embodiment described here, the measured resistance of the heater is compared to desired values listed in dependence upon the temperature. The measured temperature of the heater can also be compared to desired values listed in dependence upon resistance as an alternative.

In a further embodiment, the content of the fault memory can be used additionally for adapting the supply voltage of the oxygen probe heater to the resistance of the oxygen probe heater.

Figure 5:
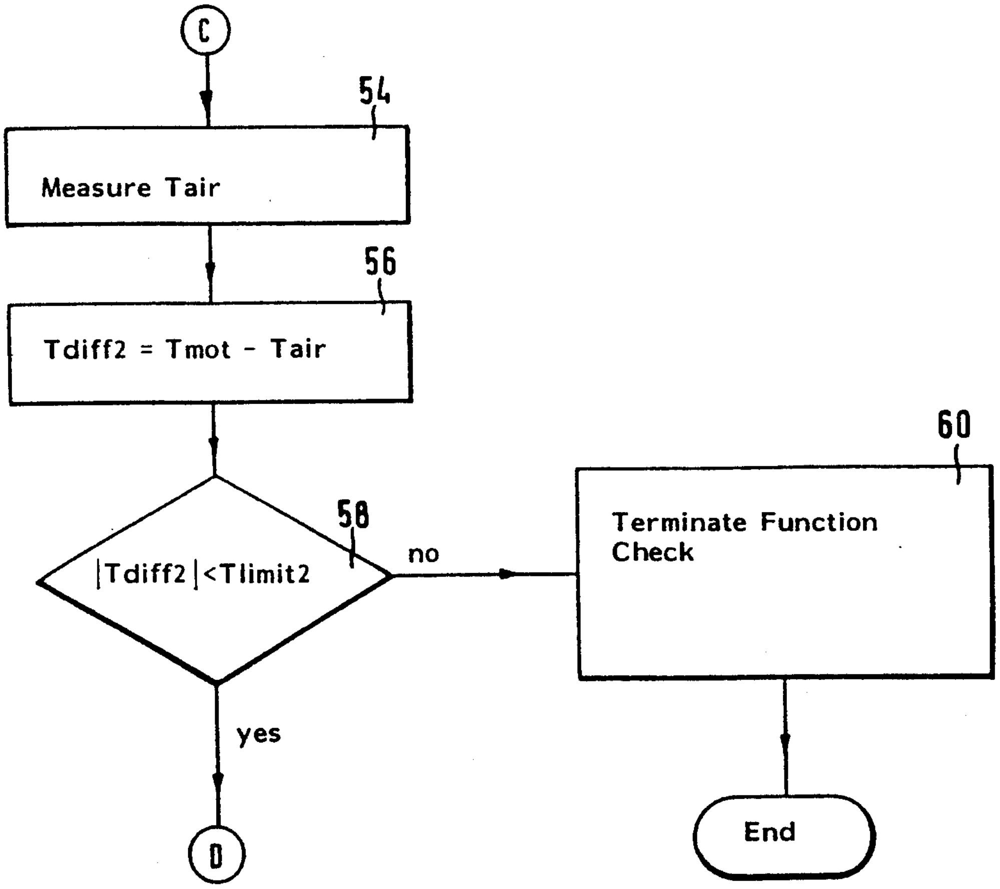

FIG. 5 shows a portion of the flowchart of an embodiment which can replace the portion between points C and D of the embodiment of FIG. 3.

At point C of the flowchart of FIG. 5, a step 54 follows wherein the temperature Tair of the intake air in the intake pipe is measured with a temperature sensor. In the next step 56, the difference Tdiff2 between the engine block temperature Tmot and the temperature Tair of the intake air is formed. An inquiry follows in step 58 as to whether the magnitude of Tdiff2 is less than a pregiven value Tlimit2. If yes, then for a running engine, the assumption can be made of a new start and a cooling-down phase and correspondingly that the temperature of the oxygen probe heater and the air temperature are approximately equal and the functional check can be continued at point D. If no, then a step 60 follows inquiry 58 and the function check is terminated.

It is understood that the foregoing description is that of the preferred embodiments of the invention and that various changes and modifications may be made thereto without departing from the spirit and scope of the invention as defined in the appended claims.

What is claimed is:

1. An arrangement for checking the operability of an electric heater in a motor vehicle such as the heater of an oxygen probe in the exhaust gas pipe of an internal combustion engine, the arrangement comprising:

temperature sensor means for detecting a temperature at a location remote from said heater;

means for determining a time point at which an assumption can be made that the temperature of said heater and the temperature measured by said temperature sensor means are approximately equal;

means for determining the electric resistance of said heater and means for determining the temperature of said heater utilizing said temperature sensor means having made the assumption that said temperature of said heater and said measured temperature are approximately equal;

means for comparing said electric resistance to desired values in the manner of a plausibility check, said desired values being stored in a characteristic field in dependence upon temperature;

means for entering the result of the check of operability in a fault memory;

supply voltage means for supplying voltage to the electric heater; and, means for adapting said supply voltage means in dependence upon said result.

2. An arrangement for checking the operability of an electric heater in a motor vehicle such as the heater of an oxygen probe in the exhaust gas pipe of an internal combustion engine, the arrangement comprising:

temperature sensor means for detecting a temperature at a location remote from said heater;

means for determining a time point at which an assumption can be made that the temperature of said heater and the temperature measured by said temperature sensor means are approximately equal;

means for determining the electric resistance of said heater and means for determining the temperature of said heater utilizing said temperature sensor means having made the assumption that said temperature of said heater and said measured temperature are approximately equal;

means for comparing said temperature of said heater to desired values in the manner of a plausibility check, said desired values being stored in a characteristic field in dependence upon resistance;

means for entering the result of the check of operability in a fault memory;

supply voltage means for supplying voltage to the electric heater; and, means for adapting said supply voltage means in dependence upon said result.

3. A method for checking the operability of an electric heater in a motor vehicle such as the heater of an oxygen probe in the exhaust gas pipe of an internal combustion engine, the method comprising the steps of:

determining an operating state of the engine for which the temperature at the mounting location of the heater and the temperature of a temperature sensor are approximately equal to each other;

carrying out a temperature measurement with said temperature sensor;

determining the resistance of the heater; and, carrying out a plausibility check of said resistance at the particular temperature.

4. The method of claim 3, the method comprising the further steps of entering the result of the operability check in a fault memory; and, utilizing the result of the operability check for adapting the supply voltage of the electric heater.

5. The method of claim 3, wherein said temperature sensor is an engine temperature sensor disposed at a location remote from said mounting location.

6. The method of claim 5, wherein the approximate temperature equality of said heater and said temperature sensor can be assumed when the engine block has cooled down by more than a pregiven temperature since the last operation of the engine.

7. The method of claim 5, wherein the approximate temperature equality of said heater and said temperature sensor can be assumed when the temperature of the engine block differs by less than a pregiven value from the temperature of the intake air while the engine is running.

8. The method of claim 5, wherein the temperature measured with said temperature sensor has the measured temperature value (Tmot), said plausibility check including the steps of:

determining a stored resistance value (R=f(Tmot)) starting from said measured temperature value (Tmost); and, concluding the presence of a malfunctioning heater in the event that the measured resistance deviates from the stored resistance value by more than a permissible tolerance.

9. The method of claim 5, said plausibility check comprising the steps of:

determining a stored temperature value (T=f(R)) starting from said measured resistance value; and, concluding the presence of a malfunctioning heater in the event that the measured temperature differs from the stored temperature value by more than a permissible tolerance.

* * * * *